United States Patent
Bansal et al.

(10) Patent No.: US 12,141,208 B2
(45) Date of Patent: Nov. 12, 2024

(54) MULTI-CHUNK RELATIONSHIP EXTRACTION AND MAXIMIZATION OF QUERY ANSWER COHERENCE

(71) Applicant: INTERNATIONAL BUSINESS MACHINES CORPORATION, Armonk, NY (US)

(72) Inventors: Sahil Bansal, Kurukshetra (IN); Atul Kumar, Bangalore (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 17/750,667

(22) Filed: May 23, 2022

(65) Prior Publication Data

US 2023/0376537 A1 Nov. 23, 2023

(51) Int. Cl.
*G06F 16/9032* (2019.01)
*G06F 16/901* (2019.01)
*G06F 16/93* (2019.01)

(52) U.S. Cl.
CPC .... *G06F 16/90332* (2019.01); *G06F 16/9024* (2019.01); *G06F 16/93* (2019.01)

(58) Field of Classification Search
None
See application file for complete search history.

(56) References Cited

U.S. PATENT DOCUMENTS

| | | |
|---|---|---|
| 6,055,544 A | 4/2000 | Derose |
| 7,933,896 B2 | 4/2011 | Dexter |
| 8,494,987 B2 | 7/2013 | Katukuri |

(Continued)

FOREIGN PATENT DOCUMENTS

WO 2011051970 A2 5/2011

OTHER PUBLICATIONS

Bernstein et al., "A Scalable System for Identifying Co-derivative Documents", SPIRE 2004, LNCS 3246, 2 pages.

(Continued)

*Primary Examiner* — Miranda Le
(74) *Attorney, Agent, or Firm* — Christopher Pignato; Douglas Crockatt

(57) ABSTRACT

Systems, methods and/or computer program products maximizing answer coherence of virtual agents responding to multi-part user queries, using relationships among extracted chunks corresponding to support document(s). Relationships are extracted by mining entities from text and images of support document(s) and mapping entities to an otology. Induced subgraphs for chunks, based on extracted entities are created and compared. Depending on amounts of overlap and/or relationships between subgraphs, relationships among chunks are identified. Chunks relationships can be complementary, contained within one another, instances of one another, or not related at all. For a given multi-part query, a query answer graph is created comprising answer nodes corresponding to potential answer candidates associated with each chunk. Using the edges between nodes and relationships identified between chunks, coherence scores are calculated along answer pathways, whereby answer pathways with the highest coherence score are selected to respond to the query.

17 Claims, 10 Drawing Sheets

(56) References Cited

U.S. PATENT DOCUMENTS

| | | | |
|---|---|---|---|
| 10,891,340 B2 | 1/2021 | Shlyunkin | |
| 10,977,266 B2* | 4/2021 | Rudolf | G06F 16/254 |
| 11,216,480 B2* | 1/2022 | Öz | G06F 16/248 |
| 11,397,762 B2* | 7/2022 | Raval Contractor | G06F 40/20 |
| 2003/0120681 A1* | 6/2003 | Baclawski | G06F 16/334 |
| 2009/0222395 A1 | 9/2009 | Light | |
| 2011/0119262 A1 | 5/2011 | Dexter | |
| 2011/0161333 A1 | 6/2011 | Langseth | |
| 2012/0317142 A1* | 12/2012 | Broecheler | G06F 16/9024 |
| | | | 707/E17.011 |
| 2015/0019541 A1* | 1/2015 | Carus | G06F 16/93 |
| | | | 707/723 |
| 2016/0179945 A1* | 6/2016 | Lastra Diaz | G06F 16/284 |
| | | | 707/739 |
| 2019/0251169 A1* | 8/2019 | Loghmani | G06F 40/295 |
| 2020/0380389 A1* | 12/2020 | Eldeeb | G06F 16/285 |
| 2021/0081602 A1 | 3/2021 | Begun | |
| 2021/0201144 A1* | 7/2021 | Jonnalagadda | G06N 3/08 |
| 2021/0294781 A1* | 9/2021 | Fernández Musoles | |
| | | | G10L 15/197 |
| 2021/0319335 A1* | 10/2021 | Jiang | G06N 5/04 |
| 2022/0067277 A1* | 3/2022 | Pentyala | G06F 40/253 |

OTHER PUBLICATIONS

Bernstein et al., "Accurate discovery of co-derivative documents via duplicate text detection", Information Systems 31 (2006), doi:10.1016/j.is.2005.11.006, pp. 595-609.

Bunescu et al., "Subsequence Kernels for Relation Extraction", NIPS'05: Proceedings of the 18th International Conference on Neural Information Processing Systems, Dec. 2005, 8 pages.

Chen et al., "Passage Extraction using Subsequence-based Query-Sensitive Maximum Cut", 2008 International Symposium on Knowledge Acquisition and Modeling, 2008, DOI 10.1109/KAM.2008.137, pp. 221-225.

Guo et al., "Entity Linking with a Unified Semantic Representation", WWW '14 Companion: Proceedings of the 23rd International Conference on World Wide Web, Apr. 7-11, 2014, Seoul, Korea, pp. 1305-1309.

Mell et al., "The NIST Definition of Cloud Computing", Recommendations of the National Institute of Standards and Technology, Special Publication 800-145, Sep. 2011, 7 pages.

\* cited by examiner

MULTI-CHUNK RELATIONSHIP EXTRACTION AND MAXIMIZATION OF QUERY ANSWER COHERENCE

BACKGROUND

The present disclosure relates generally to the field of artificial intelligence and automation. More specifically, the disclosure relates to automated support by virtual agents using text and image extraction to identify relationships between chunks of supporting documents and maximizing query answer coherence based on the extracted relationships.

A virtual agent, also known as a virtual representative or chatbot, is a type of software application that uses natural language processing and pre-defined answers to support human users accessing the virtual agent's knowledge. Virtual agents are computer programs that can leverage a mix of programmable rules and conversational artificial intelligence to offer simple services or provide users with basic help or assistance. Virtual agents can be designed to use advanced computing technologies such as machine learning or deep learning, in conjunction with NLP, to process and understand the language in which the user interacts with the virtual agent, in order to identify the correct solution to the user's problem. When a user request or query is made, virtual agents use NLP to identify keywords the human user has inputted as part of the inquiry and leverages a pre-built database, also known as a knowledge base, to respond.

Chunking is a process of extracting phrases from unstructured text and is a process of NLP used to identify parts of speech and short phrases of given sentence. Sentences of text are analyzed to identify the constituents (i.e., nouns, verbs, adjectives, etc. and groups thereof). Chunking segments and labels multi-token sequences to break down sentences or phrases into word-level tokenization and part-of-speech tagging. Similar to tokenization, which omits whitespace, chunking usually selects a subset of the tokens, and the pieces produced by a chunker do not overlap in the source text. Chunk patterns are the patterns of part-of-speech (POS) tags that define the kind of words that make up a chunk. Chunk patterns can be defined using normal regular expressions which are modified and designed to match the part-of-speech tags.

SUMMARY

Embodiments of the present disclosure relate to a computer-implemented method, an associated computer system and computer program products for maximizing answer coherence of a multi-part query using extracted relationships between chunks of at least one support document. The computer-implemented method comprises the steps of: receiving, by a processor, the multi-part query from a user; identifying, by the processor, a number of parts comprising the multi-part query using natural language processing (NLP), wherein each of the number of parts corresponds to a list of potential candidate answers extracted as the chunks from the at least one support document; creating, by the processor, a query graph comprising a plurality of answer nodes, wherein each of the answer nodes correspond to each of the potential candidate answers corresponding to each of the number of parts comprising the multi-part query, and edges connect a root node to answer nodes corresponding to a first part of the multi-part query, and the answer nodes corresponding to the first part of the multi-part query are connected by the edges to answer nodes corresponding to a subsequent part of the multi-part query; forming, by the processor, a plurality of answer node pathways within the query graph, extending from the root node through each of answer nodes, wherein each answer node pathway follows a different set of answer nodes and edges connected along the query graph; computing, by the processor an answer coherence score for each answer node pathway; and selecting, by the processor, an answer to the multi-part query using the answer nodes along the answer node pathway having a maximum answer coherence score.

BRIEF DESCRIPTION OF THE DRAWINGS

The drawings included in the present disclosure are incorporated into, and form part of the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
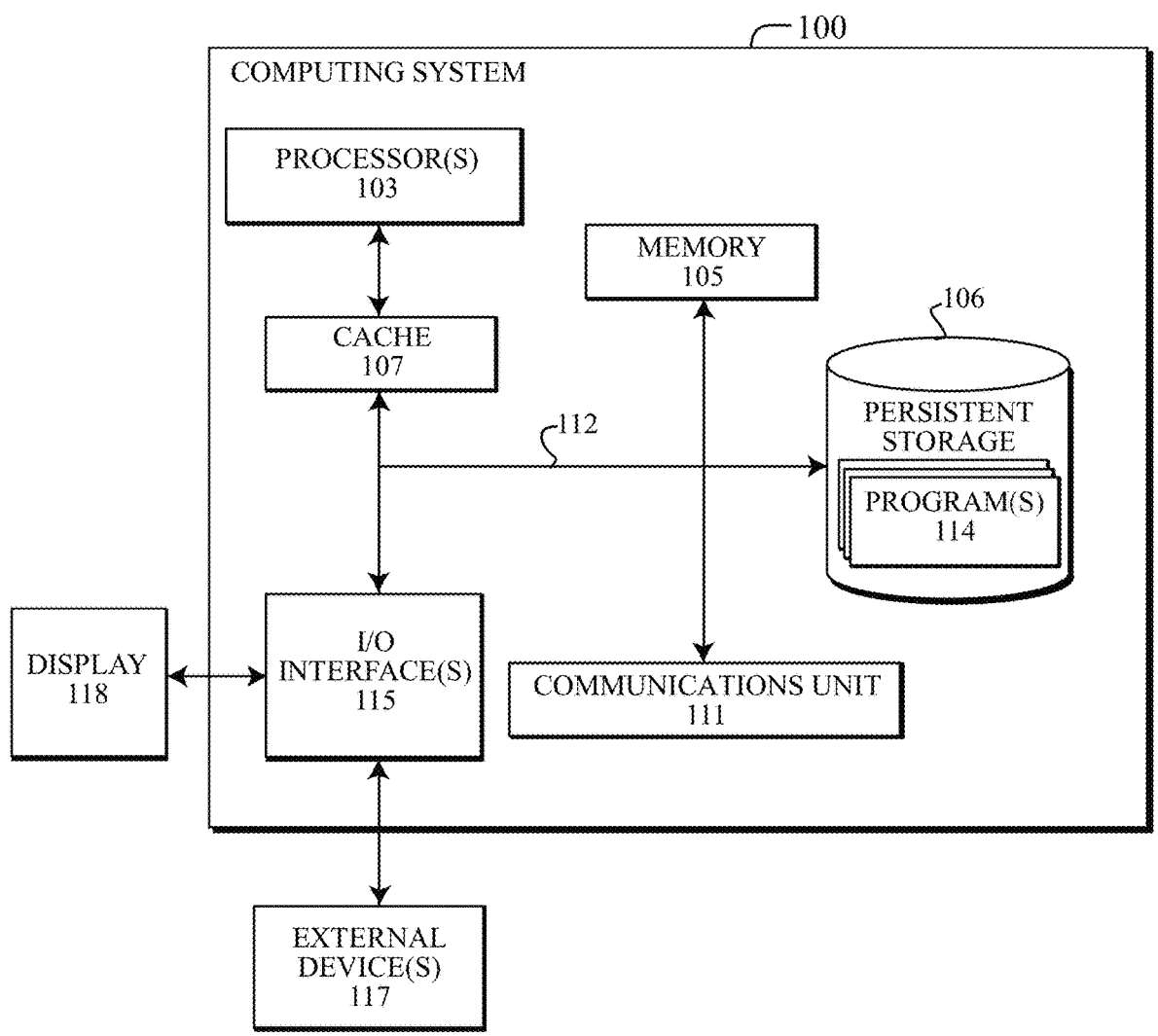
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

As the use of virtual agents become more ubiquitous in the digital era, hardware and software companies commonly use virtual agents to provide automation and support to users of their products. For example, by providing technical support and customer service using virtual agents as a first level of support. A virtual agent can help a customer service representative glean information and knowledge from an overwhelming number of support documents, which can include user manuals, product manuals, hardware maintenance manuals, blogs, websites, user forums, public platforms, etc. Very often support documents contain unstructured data within them and thus becomes important to extract information and relationships between the information made available by the support documents. Typically, an answer to a user's support query lies within a paragraph, section, subsection, or a portion of a support document which contains the answer needing to be returned as a query response. However, in addition to the portion of the support document where an answer is found, the rest of a disclosure, paragraph, subsection, section, images, or portions of the document (referred to herein as a "chunk") may include other chunks which can be provided alongside the response to the query and may further improve the query response beyond the immediate answer of a first chunk utilized in the virtual agent's response. For example, a preparation step or post-solution step that may be necessary for optimally performing the solution indicated in the answer portion of the query response, or additional maintenance steps following implementation of the query response's solution. Embodiments of the present disclosure recognize that there does not currently exist a system, program product or associated method which extracts relevant and applicable relationships between chunks present in a set of technical support documents (including text and/or images), nor a system which uses relationships extracted from chunks to maximize query answer coherence.

Embodiments of the present disclosure leverage the use of natural language processing and relationship extraction among chunks to create a virtual agent system and/or program product that responds to users' multi-part queries comprising multiple potential answers, spanning several different chunks of the support documents, with maximum answer coherence using the extracted relationships among the plurality of chunks. During extraction of relationships between the various chunks corresponding to information available via support document(s), extraction can occur by mining entities present within each chunk. Embodiments can use a chunk extractor to mine both text and/or images. Text may be mined using one or more entity recognition techniques, while images associated with each of the chunks can be extracted using one or more computer vision techniques. For example, object detection. Once entities of the chunk(s) are extracted, the extracted entities can be mapped directly to a domain ontology (when possible) or indirectly mapped using a wordnet or embedding-based similarities to map the entities. From the mapped entities, an induced subgraph of the domain ontology can be constructed for each of the chunks, whereby similarities and differences between the chunks can be compared to find relationships (or a lack thereof) between the chunks. For example, a first induced subgraph that totally overlaps with a second subgraph may indicate a first chunk is contained within a second chunk, while a first subgraph partially overlapping a second subgraph may indicate that the first chunk and second chunk are complementary to one another. Moreover, subgraphs that are a child of another subgraph may indicate that the first chunk is an instance of a second chunk, whereas subgraphs that are within two separate parts of the ontology graph may indicate that the chunks are not related to one another and that a weight of the edge connecting the two subgraphs of the two unrelated chunks are the distance between the two subgraphs.

Furthermore, embodiments of the present disclosure may use the relationships identified between the plurality of different chunks of the support documents to maximize answer coherence when a virtual agent is responding to a query inputted by a user. As a multi-part query is received by the virtual agent, each part of the total number of parts (N) may include a list of potential answer candidates which may each correspond to a chunk of the supporting documents. Embodiments of the present disclosure can create a query answer graph from the potential candidate answer chunks. For every potential candidate answer for each part of the multi-part query, an answer node may be created. Edges connecting the answer nodes may be added to the query answer graph, whereby each answer node comprising potential answer candidate for a given part of the query can be connected to answer nodes corresponding to the immediately subsequent parts of the multi-part query. Each edge connecting answer nodes to one another can be labelled with a relationship as identified and discussed above. Moreover, a root node may be connected via an edge to each of the plurality of answer nodes corresponding to the first part of the multi-part query.

Embodiments of the present disclosure may use the query answer graph to calculate and identify a response to the multi-part query having maximum answer coherence by calculating a coherence score. From the root node of the query answer graph, multiple answer pathways may be generated. Answer pathways extend from the root node and traverse along the edges to at least one answer node for each part of the multi-part query. Each pathway can be scored based on the labels and/or weights of each of the edges along the answer pathways. The coherence score for each answer pathway may penalize edges along the pathway that represent relationships between answer nodes, such as answer nodes that represent chunks that are complimentary, contained within one another, or instances of one another; and reward answer pathways that include edges between answer nodes that are unlabeled and thus unrelated to one another. The answer pathway of the query answer graph with the highest coherence score may be used to identify one or more chunks from the supporting documents to provide as the answer in response to the user's query. Thus, answering the multi-part query of the user with maximum answer coherence.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
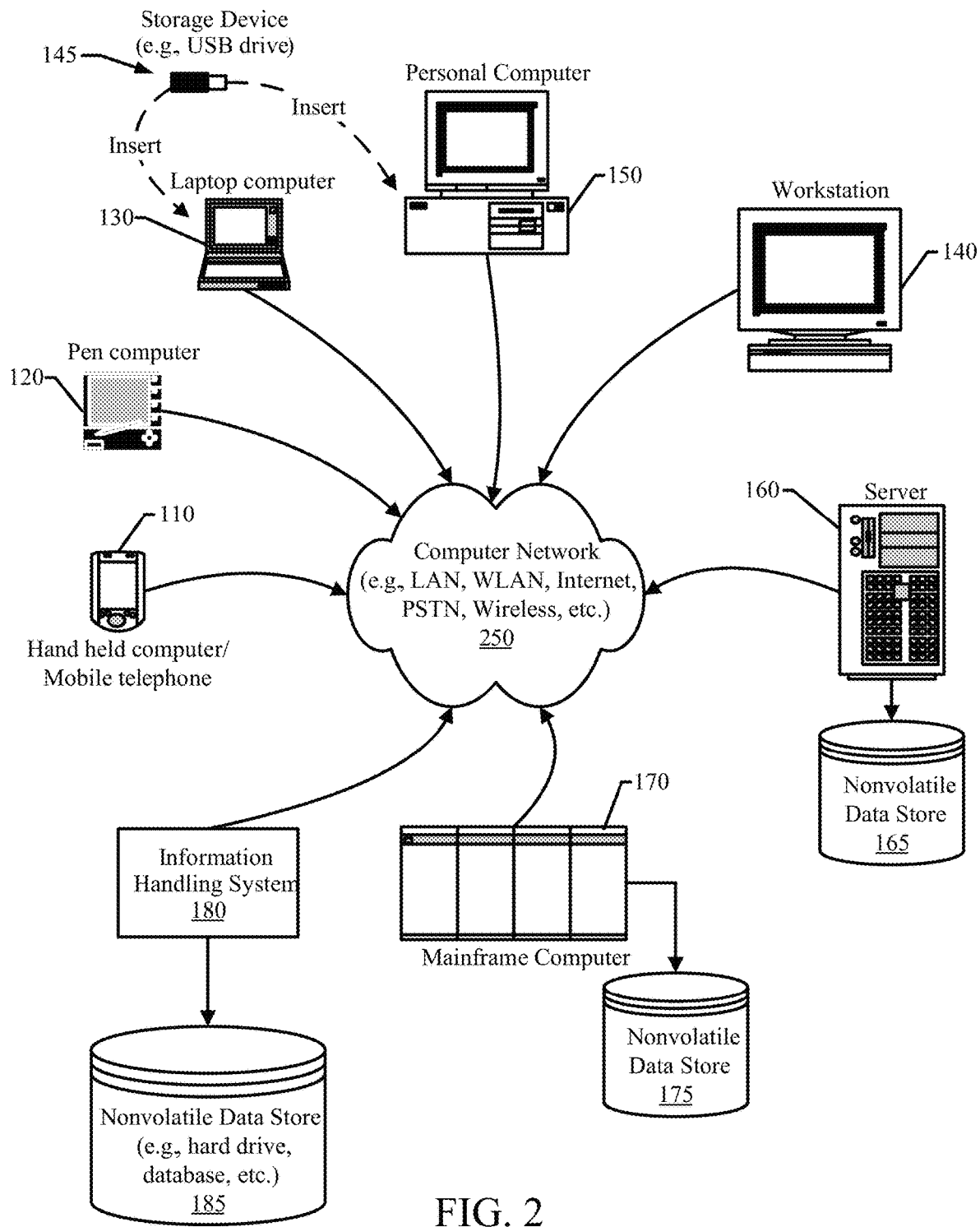
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
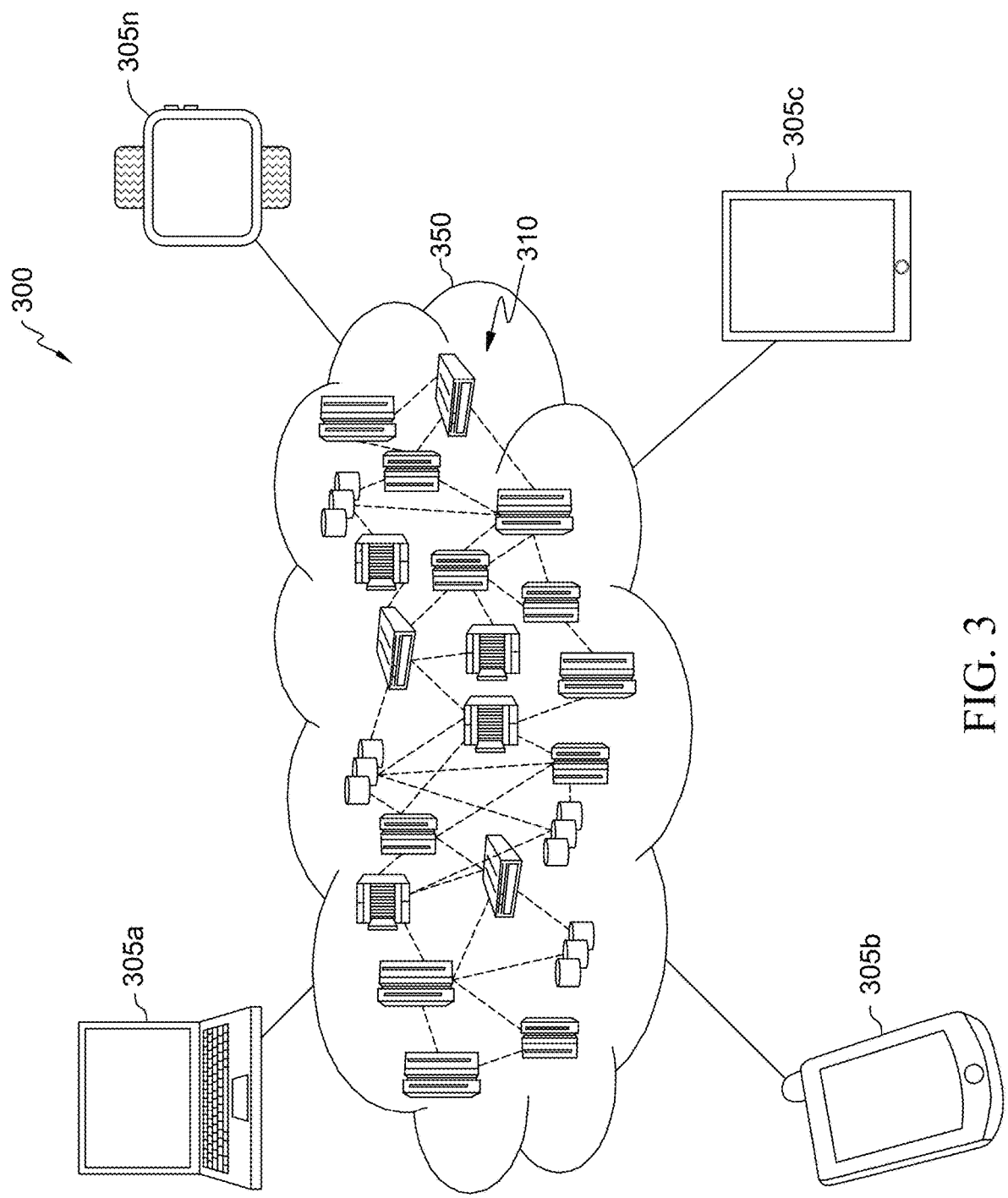
FIG. 3 depicts a block diagram illustrating an embodiment of a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n, smart glasses, sensors, or other IoT devices. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
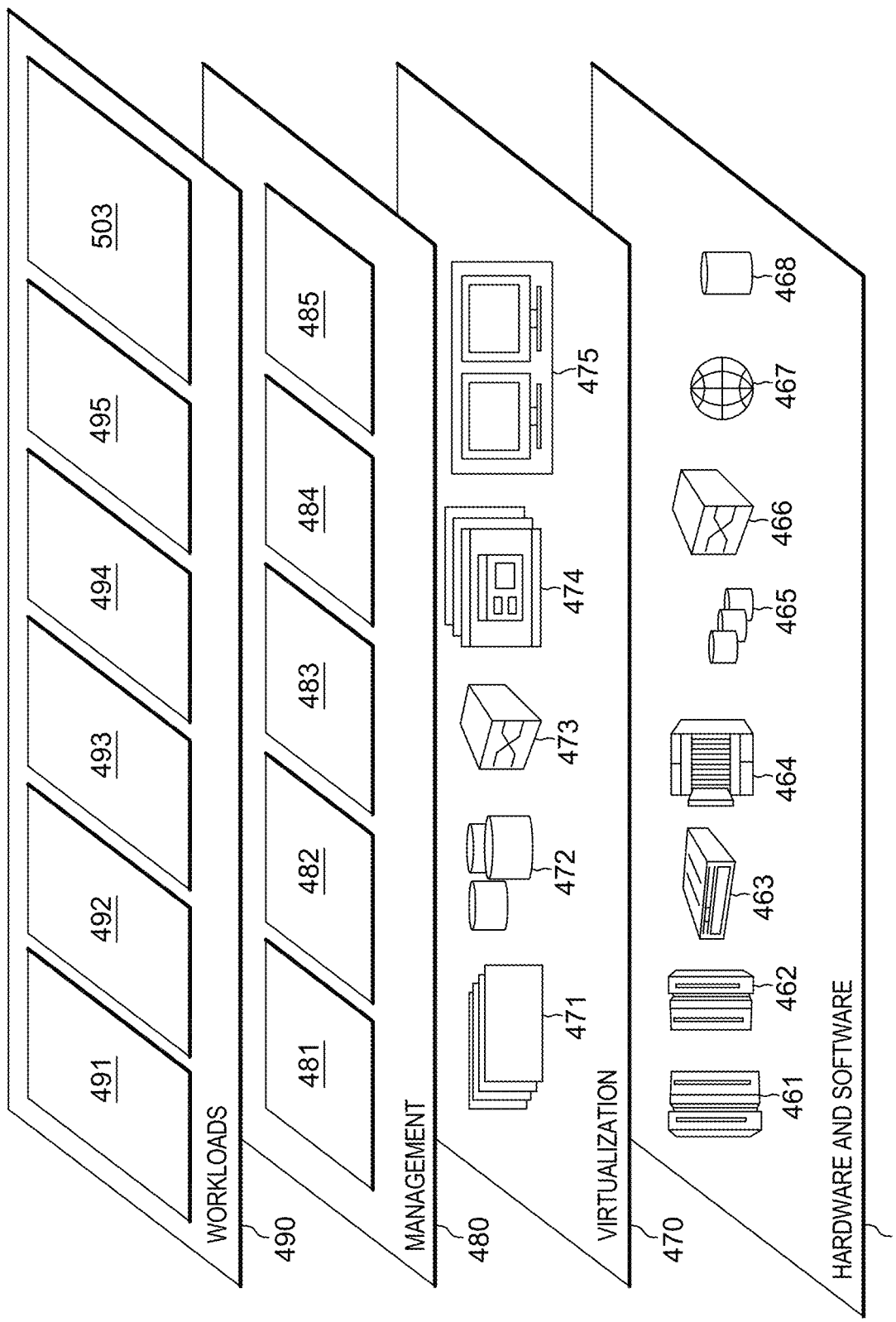
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and video streaming services 491, data analytics processing 492, multi-cloud management 493, transaction processing 494; video conferencing 495 and answer module 503 providing virtual agent services to connected user devices 305.

System for Maximizing Answer Coherence of Multi-Part Query Using Extracted Relationships Between Chunks It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
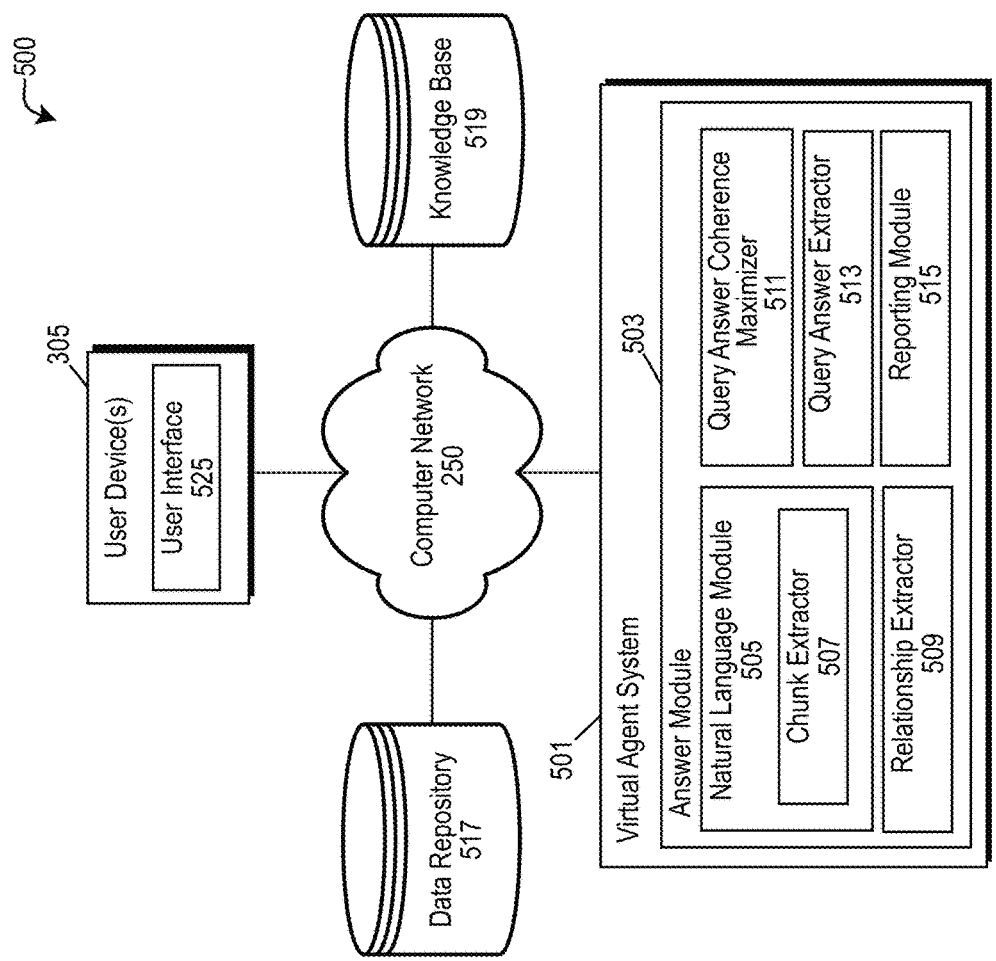
FIG. 5 depicts a functional block diagram describing an embodiment of a computing environment for maximizing coherence of multi-part query response by a virtual agent using extracted relationships of chunks corresponding to support documents, in accordance with the present disclosure.
Figure 6:
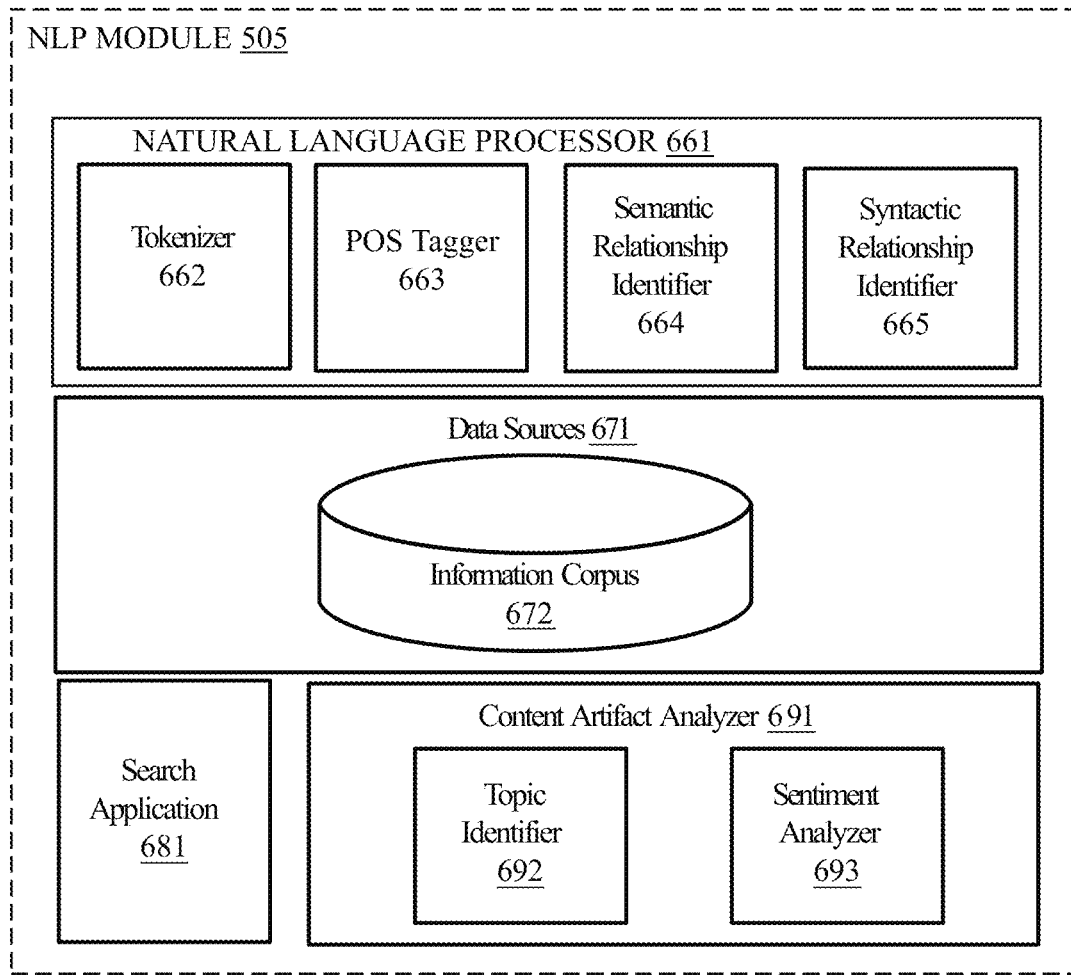
FIG. 6 depicts a block diagram describing an embodiment of a natural language processor module, in accordance with the presence disclosure.
Figure 7:
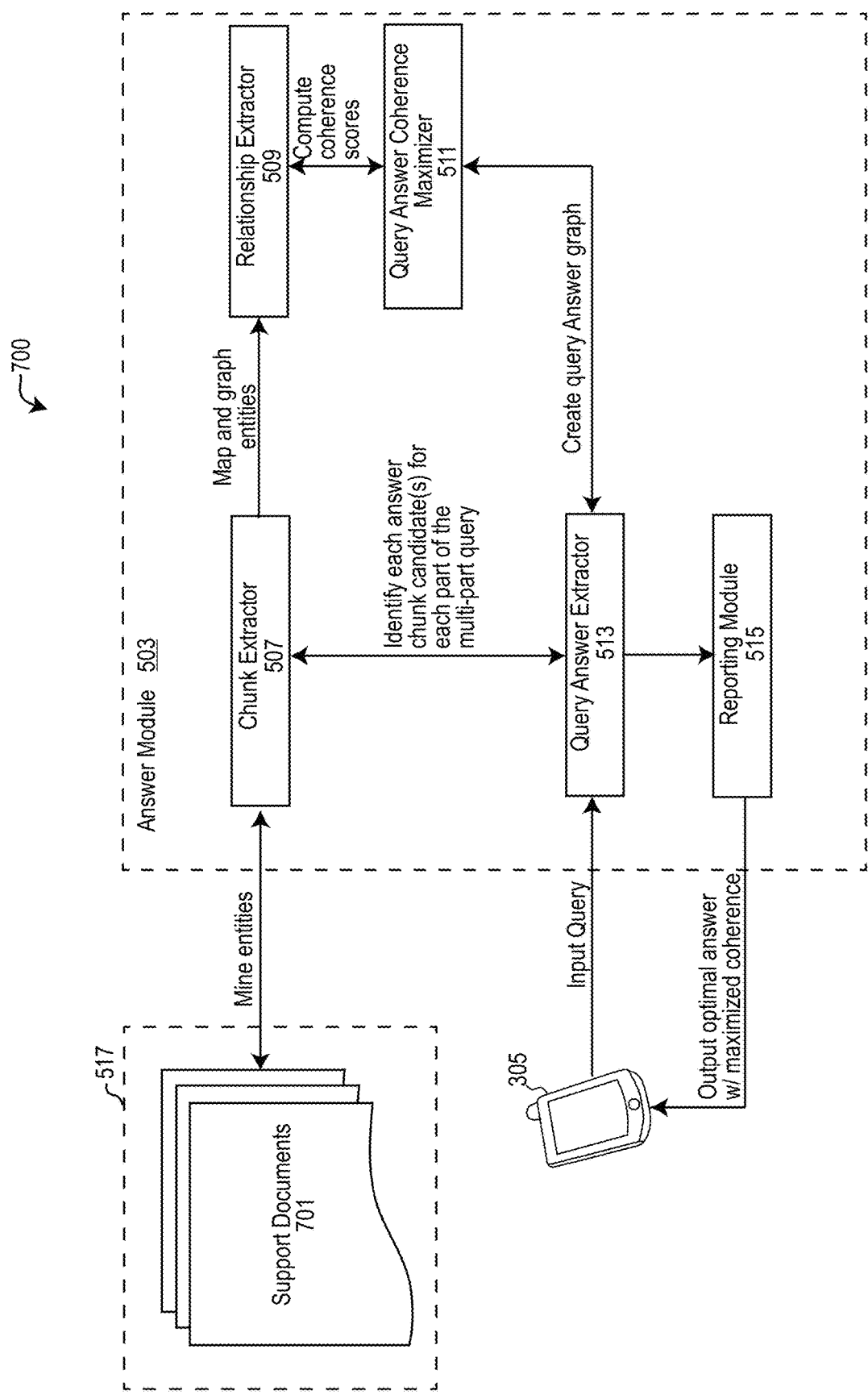
FIG. 7 depicts a block diagram describing an embodiment of a workflow for maximizing coherence of multi-part query responses by a virtual agent using extracted relationships of chunks corresponding to support documents.

Referring to the drawings, FIGS. 5-7 depict approaches for extracting relationships between chunks of support documents 701 and using the extracted relationships to maximize answer coherence in response to multi-part queries, wherein approaches can be executed using one or more computer systems 100 operating within a computing environment 500, 700 and variations thereof. The approaches implement systems, methods and computer program products maximizing answer coherence by a virtual agent using relationships extracted between a plurality of chunks. Embodiments of computing environments 500, 700 may include one or more computer systems 100 interconnected via a computer network 250. The computer systems 100 connected to the computer network 250 may be specialized systems or devices. The computer systems of the computing environments 500, 700 may be self-contained or part of a dispersed system which can include the interconnection of virtual agent system 501, one or more user device(s) 305, one or more data repository 517 and knowledge base(s) 519. The computing systems exemplified in FIGS. 5-7 may not only comprise the elements of the systems and devices depicted in the drawings of FIGS. 5-7 but may further incorporate one or more elements of a computing system 100 shown in FIG. 1 and described above. Although not shown in the drawings, one or more components of the computing system 100 may be integrated into the embodiments virtual agent system 501, user device(s) 305 and computing systems maintaining data repository 517 and knowledge base 519, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Referring to the drawing of FIG. 5, embodiments of computing environment 500 may include a virtual agent system 501, which may be responsible for providing one or more features or services of a virtual agent being accessed by one or more users via a user device 305. A user interface 525 displayed by the user device 305 may facilitate the exchange of communication between the user and the virtual agent hosted by the virtual agent system 501. Embodiments of the user interface 525 may allow the users to input one or more queries and request for various services and support features provided by the virtual agent. In response to requests and queries received from users, the virtual agent system 501 can generate and output one or more responses from the virtual agent system 501 to the user interface 525. The responses received from the virtual agent system 501 can be displayed to the user by the virtual agent interfacing with the user via the user interface 525.

Embodiments of the virtual agent system 501 may comprise one or more components or modules that may be tasked with implementing specific functions, tasks or processes associated with extracting relationships between chunks of the support documents 701 which may be maintained within one or more data repository 517; and maximizing query answer coherence in response to user queries transmitted by a user via the user interface 525 to a virtual agent. For example, one or more functions and features of the virtual agent system 501 may be performed by answer module 503. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more computing systems 100 operating as part of the computing environment 500. For example, the answer module 503 can be a program, service and/or application loaded into the memory 105, persistent storage 106 or cache 107 of a host system, such as virtual agent system 501. Embodiments of the answer module 503 may comprise a plurality of components and/or sub modules assigned to carry out specific tasks, processes or functions of the answer module 503. As shown in the exemplary embodiment of the answer module 503 of FIG. 5, the answer module 503 may comprise components such as a natural language module 505, chunk extractor 507, relationship extractor 509, query answer coherence maximizer 511, query answer extractor 513 and/or reporting module 515.

Natural language module 505 may perform processes, tasks and/or functions associated with analyzing user input entered into the user interface 525 as the user interacts with the virtual agent. The natural language module may scan the user input for one or more intents or entities to help identify the topics and subject matter of the user input, the tone or sentiment of the user and potential classifications that may be relevant to the user input. Embodiments of the natural language module 505 may be configured to analyze content artifacts and/or textual data of user input entered into user interface 525. In some embodiments, user device 305 may transmit raw textual/image data and may send user input in the form of unstructured textual documents/transcripts (e.g., "electronic documents") to the virtual agent system 501, wherein the natural language module 505 may conduct an analysis of the user input in order to respond to the user input received by the virtual agent system 501. Natural language module 505 may analyze an unstructured textual document or text-based inputs (e.g., a content artifact) to identify one or more terms associated with the content topic, including one or more intents and/or entities evidenced by the user input.

As shown in FIG. 6, exemplary embodiments of the natural language module 505 (abbreviated "NLP module 505") may include a natural language processor 661, data sources 671, a search application 681, and/or a content artifact analyzer 691. The natural language processor 661 may comprise a computer module that analyzes the received unstructured textual conversation transcript(s) and other electronic documents provided to the virtual agent as user input. The natural language processor 661 may perform various methods and techniques for analyzing user input (e.g., syntactic analysis, semantic analysis, etc.). The natural language processor 661 may be configured to recognize and analyze any number of natural languages. In some embodiments, the natural language processor 661 may parse passages of the user input. Further, the natural language processor 661 may include various modules or plugins to perform analyses of the user input. These modules and/or plugins may include, but are not limited to, a tokenizer 662, a part-of-speech (POS) tagger 663, a semantic relationship identifier 664, and a syntactic relationship identifier 665.

Embodiments of tokenizer 662 may be a computer module that performs lexical analysis of the user's input into the user interface 525. The tokenizer 662 may convert a sequence of characters into a sequence of tokens. A token may be a string of characters included in the user input and/or electronic documents provided by the user and categorized as a meaningful symbol. Further, in some embodiments, the tokenizer 662 may identify word boundaries of the text inputted the chat services of the virtual agent and may break text passages within the user input into component text elements, such as words, multiword tokens, numbers, and punctuation marks. In some embodiments, the tokenizer 662 may receive a string of characters, identify the lexemes in the string, and categorize them into tokens.

Consistent with various embodiments, the POS tagger 663 may be a computer module that marks up a word in passages to correspond to a particular part of speech. The POS tagger 663 may read a passage or other text in natural language and assign a part of speech to each word or other token. The POS tagger 663 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed user inputs (e.g., the content of one formula may shed light on the meaning of text elements in another formula). In some embodiments, the output of the natural language processor 661 may populate a text index, a triple store, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 663 may assign include, but are not limited to, comparative or superlative adverbs, wh-adverbs, conjunctions, determiners, negative participles, possessive markers, prepositions, wh-pronouns, and the like. In some embodiments, the POS tagger 663 may tag or otherwise annotate tokens of a passage with part of speech categories. In some embodiments, the POS tagger 663 may tag tokens or words of a passage to be parsed by the natural language processor 661.

In some embodiments, the semantic relationship identifier 664 may be a computer module that may be configured to identify semantic relationships of recognized text elements (e.g., words, phrases) in user input and/or documents transmitted by the user device 305 to the virtual agent. In some embodiments, the semantic relationship identifier 664 may determine functional dependencies between entities and other semantic relationships. Consistent with various embodiments, the syntactic relationship identifier 665 may be a computer module that may be configured to identify syntactic relationships in a passage composed of tokens. The syntactic relationship identifier 665 may determine the grammatical structure of sentences such as, for example, which groups of words are associated as phrases and which word is the subject or object of a verb. The syntactic relationship identifier 665 may conform to formal grammar.

In some embodiments, the output of natural language processor 661 may be used by search application 681 to perform a search of a set of (e.g., one or more) corpora to retrieve information regarding content artifacts and/or media. As used herein, a corpus may refer to one or more data sources 671. In some embodiments, the data sources 671 (such as data repository 517) and may include data warehouses, information corpora, data models, and document repositories. In some embodiments, the data sources 671 may include an information corpus 672. The information corpus 672 may enable data storage and retrieval of support documents 701. In some embodiments, the information corpus 672 may be a storage mechanism that houses a standardized, consistent, clean, and integrated list of conversation topics, emotional sentiments, and support documents 701 (including both text documents and images). The data may be sourced from various operational systems. Data stored in the information corpus 672 may be structured in a way to specifically address reporting and analytic requirements. In some embodiments, the information corpus 672 may be part of data repository 517 or other a relational database, triple store, or text index.

In some embodiments, the content artifact analyzer 691 may be a module that identifies conversational topics and user sentiments associated with one or more topics. In some embodiments, the content artifact analyzer 691 may include a topic identifier 692 and a sentiment analyzer 693. When an unstructured textual input is received by the answer module 503, the content artifact analyzer 691 may be configured to analyze the user input using natural language processing to identify one or more content topics, including one or more intents and entities associated with the user input. The content artifact analyzer 691 may first parse the conversation generated by the user input using the natural language processor 661 and related subcomponents 662-665. After parsing the conversation, the topic identifier 692 may identify one or more topics present in the content of the user input. This may be done, for example, by searching an information corpus 272, such as a data repository 517 comprising support documents 701 for chunks that may be considered potential answer candidate chunks in response to the user's input, using the search application 681.

The sentiment analyzer 693 may determine the content sentiment for the user input, according to the content topic identified by topic identifier 692. This may be done by using the search application 681 to traverse the various data sources (e.g., data repository 517) for information regarding the terms and phrases used within the user input. The sentiment analyzer 693 may search, using natural language processing, documents from the various data sources 671 for terms related to those detected in the user input.

Embodiments of answer module 503 may comprise a chunk extractor 507. The chunk extractor 507 may be a component of NLP module 505 as shown in FIG. 5 in some embodiments. In alternative embodiments, chunk extractor 507 may be a component that is separate from NLP module 505 but may communicate therewith or utilize output from NLP module 505. Embodiments of chunk extractor 507 may perform processes, tasks and/or functions of the answer module 503 directed toward mining entities from textual portions of chunks and/or images associated with chunks of support documents 701 stored by data repository 517, data sources 671 and information corpuses 672 that may maintain text or image data that may be used to respond or formulate a response to queries posed by a user to the virtual agent. Mining entities from chunks of supporting text-based documents and images, may be an initial step toward extracting relationships between two or more chunks. Chunk extractor 507 may mine entities from the inputted chunks differently depending on the type of data within the chunk being inputted into the chunk extractor 507. Textual portions of inputted chunks may be mined using text extraction and entity recognition techniques, whereas portions of chunks inputted into the chunk extractor 507 which comprise images associated with the chunk may be extracted using computer vision techniques, such as object detection.

One type of entity extraction technique that may be implemented by chunk extractor 507 to mine entities from chunks comprising text data may be referred to as named entity extraction (NER). NER enables machines to automatically identify and extract entities using NLP to automatically pull-out specific data from the unstructured text of the chunk and classify the text according to pre-defined categories. NER techniques can make the unstructured data machine readable (or structured) for processing actions such as information retrieval, extracting facts and answer questions posed by users. Named entities may refer to sets of elements for understanding the text where the entities are being extracted. Some common entities come from parts of speech (like nouns, verbs, adjectives, etc.). Nouns in particular may be helpful in understanding the subtle details in a sentence, and may also include proper nouns, numerical expressions of time or quantity, phone numbers, monetary values and/or dates. Chunk extractor 507 may implement NER as a process where a sentence or a chunk of text is parsed through to find entities that can be put under categories like names, organizations, locations, quantities, monetary values, percentages, etc. Entity extraction performed by the chunk extractor 507 can sift through and find meaningful information that may be present in large amounts of unstructured text data. Embodiments of chunk extractor 507 include the use of a pre-trained model machine learning model. While traditional NER algorithms may include only names, places, and organizations, models used by chunk extractor 507 can also be dynamically trained to extract more than names, organizations, locations, dates, etc. and may be a customized machine learning model that has been trained to extract entities specific to the types of products or services offered to users and supported by the virtual agent.

Embodiments of chunk extractor 507 may also mine entities from images associated with inputted chunks. As noted above, computer vision techniques may be used by chunk extractor 507. Computer vision may refer to a field of artificial intelligence (AI) that enables computers and systems to derive meaningful information from digital images, videos and other visual inputs. To identify objects within images or other visual inputs, chunk extractor 507 may run analyses of data over and over until chunk extractor 507 can discern distinctions and ultimately recognize images. For example, to train chunk extractor 507 to recognize automobile tires, chunk extractor 507 may be fed vast quantities of tire images and tire-related items to learn the differences and recognize a tire, especially one with no defects. Components that may be used by the chunk extractor 507 to mine entities from visual inputs such as images, may include deep learning, a convolutional neural network (CNN) and/or a recurrent neural network (RNN).

Embodiments of chunk extractor 507 may use machine learning algorithmic models that enable chunk extractor 507 to teach itself about the context of visual data. Once enough data is fed through the model, the chunk extractor 507 will "look" at the data and teach itself to tell one image from another. Algorithms enable the machine to learn by itself, rather than someone programming it to recognize an image. A CNN helps a machine learning model or deep learning model "look" by breaking images down into pixels that are given tags or labels. It uses the labels to perform convolutions (a mathematical operation on two functions to produce a third function) and makes predictions about what it is "seeing." The neural network runs convolutions and checks the accuracy of its predictions in a series of iterations until the predictions start to come true. The CNN first discerns hard edges and simple shapes, then fills in information as it runs iterations of its predictions. A CNN is used to understand single images. A RNN can be used in a similar way for video applications to help the chunk extractor understand how pictures in a series of frames are related to one another.

Relationship extractor 509 may perform functions, processes and/or tasks of the answer module 503 associated with identifying relationships between chunks of support documents 701 using the entities extracted by the chunk extractor 507. Relationship extractor 509 may identify the relationships between chunks using entities extracted therefrom by mapping the extracted entities to entities of a domain ontology that has been inputted into or retrieved by the relationship extractor 509. For example, the ontology being used to map entities of the chunks may be an existing ontology that has been previously generated and/or continuously updated by the virtual agent system 501 or other computing systems. The ontology may be stored as part of a knowledge base 519 that may be accessible to the virtual agent system 501. An ontology may refer to a set of representational primitives with which to model a domain of knowledge or discourse. The ontology may be a formal representation of the knowledge by a set of concepts within a domain and the relationships between the concepts and may be used to reason about the properties of the domain or describe the domain. For example, the representational primitives may refer to classes (or sets), attributes (or properties), and relationships (or relations among class members). The definitions of the representational primitives may include information about their meaning and constraints on their logically consistent application. An ontology can be viewed as a level of abstraction of data models, analogous to hierarchical and relational models. A static ontology may describe things that exist, their attributes and relationship, while a dynamic ontology describes the world in terms of states, state transitions and processes.

In some embodiments, relationship extractor 509 may be able to directly map the extracted entities from the text or images of the chunks to the entities of the ontology. In some instances, the entities extracted from the text and/or images of the chunks cannot be directly mapped to the entities of the ontology by the relationship extractor 509. In such a scenario where direct mapping between extracted entities and ontology entities is not feasible, the relationship extractor 509 may use a wordnet or embedding-based similarities to map the extracted entities. A wordnet may refer to network of words linked by lexical and semantic relations. For example, nouns, verbs, adjectives and adverbs are grouped together into sets of cognitive synonyms referred to as synsets, each expressing a specific concept. Synsets can be interlinked by conceptual-semantic and/or lexical relations, resulting in a network of related words and concepts that can be navigated. Embedding-based mappings to map the extracted entities may use Vector Space Models (VSM) to embed words in vector space wherein similarly defined words are mapped near each other in the space referred to as "Word Embedding". For example, by using Word2vec model which may implement a continuous Bag-of-Words (CBOW) model and/or a Skip-Gram model. CBOW uses source words to predict the target words, by treating the context of the sentence as a single observation towards predicting the target word, whereas the Skip-Gram model uses target words to predict the source or context of the surrounding words. Once the word vectors are reduced to two-dimensions, it is possible to see relationships between certain words. Words that share semantic or syntactic relationships can be represented by vectors of similar magnitude and be mapped in close proximity to each other in the word embedding.

Using the mapped entities of the ontology graph, relationship extractor 509 can construct an induced subgraph of the ontology graph for each chunk of support documents 701. Each node of the subgraph is also a node of the ontology and every edge in the subgraph is also an edge of the ontology. An induced subgraph may refer to a particular type of subgraph wherein the set of vertices for the subgraph of the ontology has all edges of the ontology where both endpoint nodes of the ontology are present in the subgraph. For the purposes of comparing relationships between a first chunk and a second chunk, the relationship extractor 509 can construct an induced subgraph of the first chunk and the subgraph of the second chunk, using the entities mapped to the ontology. Based on the similarities or differences between the subgraphs, relationship extractor 509 may compute relationships between the chunks. For example, upon comparing the subgraphs, if the first subgraph corresponding to the mapping of entities extracted from the first chunk completely overlaps the second subgraph corresponding to the mapping of entities extracted from the second chunk, the relationship extractor 509 may conclude that the first chunk is entirely contained within the second chunk (i.e., a "contained" relationship). Moreover, if the subgraph of the first chunk partially overlaps the subgraph of the second chunk, the first chunk and second chunk being compared and contrasted may be referred to has being "complimentary" (i.e., a "complimentary" relationship). Furthermore, if the subgraph of the first chunk is a child of the second subgraph corresponding to the second chunk, the first chunk is considered an "instance" of the second chunk. Likewise, it should be apparent to a person skilled in the art that different and/or other relationship names may be used to represent the relationships between the chunks as identified by the relationship extractor 509. For example, relationships between answer chunks could be identified as being "equivalent", "include", "supplementary", etc. In some instances, the relationships may define timing or positioning between the answer nodes. for example, the relationship may include labels such as "pre-instructions", "post-instructions", "followed by", "results of", etc. Moreover, if the first subgraph and the second subgraph are comprised of nodes that are positioned entirely within different parts of the ontology graph and do not partially overlap or are a child of one another, then the chunks being compared may be deemed "not related" by the relationship extractor 509. For chunks deemed to have a "not related" relationship, the relationship extractor 509 may define a weight on the edge as the distance between the two subgraphs.

Embodiments of a query answer extractor 513 may perform the functions, processes and/or tasks of the answer module 503 directed toward using NLP module 505 to apply one or more NLP techniques to understand incoming multi-part queries from a user device 305 and identify a number of parts in the multi-part query and may also conduct document retrieval from the data repository 517. For each part of the multi-part query, the query answer extractor 513 can perform filtering operations to help reduce a large corpus of support documents that may be available from data repository 517 into the most relevant documents for the specific query. From the filtered results, query answer extractor 513 can identify each of the potential answer candidate chunks that correspond to each part of the multi-part query. Query answer extractor 513 may pass the potential answer candidate chunks identified for each part of the multi-part query to the query answer coherence maximizer 511 to find the optimal query answer to return in response to the user's multi-part query.

Embodiments of the query answer coherence maximizer 511 may perform functions, processes and/or tasks of the answer module 503 associated with using the potential answer candidates identified by the query answer extractor 513 to construct a query answer graph. Using the query answer graph, the query answer coherence maximizer 511 can calculate query answer scores in order to identify the best answer path for responding to a user's multi-part query. For every candidate answer identified by the query answer extractor 513, the query answer coherence maximizer 511 can create an answer node on the query answer graph. For example, if a multi-part query is identified as having 3 parts (i.e., N=3), and there are two answer candidates for each part, the answer nodes on the query answer graph can be labelled as part 1-answer 1 (p1_a1), part 1-answer 2 (p1_a2), part 2-answer 1 (p2_a1), part 2-answer 2 (p2_a2), part 3-answer 1 (p3_a1), and part 3-answer 2 (p3_a2). Each candidate answer represented as an answer node on the query answer graph can correspond to an answer chunk of the support documents 701. Edges may connect each of the answer nodes in the first part of the multi-part query to each answer node of the second part of the query, while each answer node in the second part of the query graph can connect via an edge to the next subsequent part (if applicable), until the answer nodes of the penultimate part of the multi-part query are connected via edges to each of the answer nodes corresponding to the final part of the multi-part query. Since each of the answer nodes correspond to chunks of the support documents 701, the query answer coherence maximizer 511 can label the edges between answer nodes with the relationships between the chunks previously identified by the relationship extractor 509. For example, if the chunk associated with p1_a1 is an "instance" of p2_a1, then the edge connecting these answer nodes p1_a1 to p2_a1 on the query answer graph can be labelled with "instance", signifying the relationship between the answer nodes. Adding the edges for each part and labelling each of the edges can be repeated by the query answer coherence maximizer 511 until the query answer graph is fully constructed and any answer nodes having relationships between their requisite chunks are labelled. For each of the answer nodes where the chunks are not related, the edge connected the unrelated answer nodes in the query answer graph can remain unlabeled.

Embodiments of the query answer coherence maximizer 511 can further complete the generation of the query answer graph by adding a root node and connecting the root node via one or more edges connecting the root node to each of the answer nodes corresponding to the first part of the multi-part query. Once the root node has been added and the edges have been connected to the answer nodes of the corresponding parts, multiple answer pathways are made possible as the pathways are traversed from the root node through the leaf nodes of the graph (i.e., the answer nodes) whereby the answer pathways include at least one answer node present for each part of the multi-part query. As each answer pathway is traversed, embodiments of the query answer coherence maximizer 511 can calculate an answer coherence score for each of the possible answer pathways, using both the labels (or lack thereof) and/or weights on the edges between the answer nodes positioned along the answer pathway.

In the exemplary scoring system, the query answer coherence maximizer 511 can, for every edge labelled with a relationship between answer nodes, penalize the answer pathway for having a relationship. For example, when calculating the answer coherence score, edges labeling the answer nodes of the answer pathway defining the relationship between corresponding answer chunks as being "complimentary", "contained" and/or an "instance" of one another, may be penalized with a negative value, such as a −1 to the coherence score for each edge labelled with a relationship. Likewise, each edge between answer nodes that are unlabeled, indicating that the chunks corresponding to the answer nodes are not related to one another within the ontology can be rewarded by increasing the answer coherence score. For example, an edge weight representing the distance between the two subgraphs of the answer chunks can be applied to the coherence score.

Upon traversing each of the answer pathways of the answer query graph and calculating a final coherence score for each combination of the possible answer sets for responding to the multi-part query, defined by the pathways' answer nodes; the answer pathway with the highest coherence score can be selected by the query answer coherence maximizer 511 in response to the user's multi-part query. Embodiments of query answer coherence maximizer 511 may provide the coherence scores to the query answer extractor 513, which may retrieve the content of the chunks from one or more data repositories 517 corresponding to the answer nodes of the selected answer pathway with the highest coherence score. Query answer extractor 513 may respond directly to the inputted multi-part query by outputting the response answers to the user interface 525 and display the text and/or images of the chunks corresponding to the answer nodes on the user device 305, whereby the user visually sees the displayed answers provided by the virtual agent interacting with the user. In alternative embodiments, a reporting module 515 of the answer module 503 may be implemented to generate and display the text and/or images of the chunks that comprise the answer pathway having the highest coherence score. Reporting module 515 may retrieve text and image data from the corresponding data repository 517 storing data chunks, create the response to the multi-part query and output the multi-part answer to the user interface 525 wherein the user receives the displayed answer(s) from the virtual agent, which may include the text and/or image data of the chunks corresponding to the answer nodes of the optimal answer pathway (i.e., pathway with the highest coherence score).

Figure 8A:
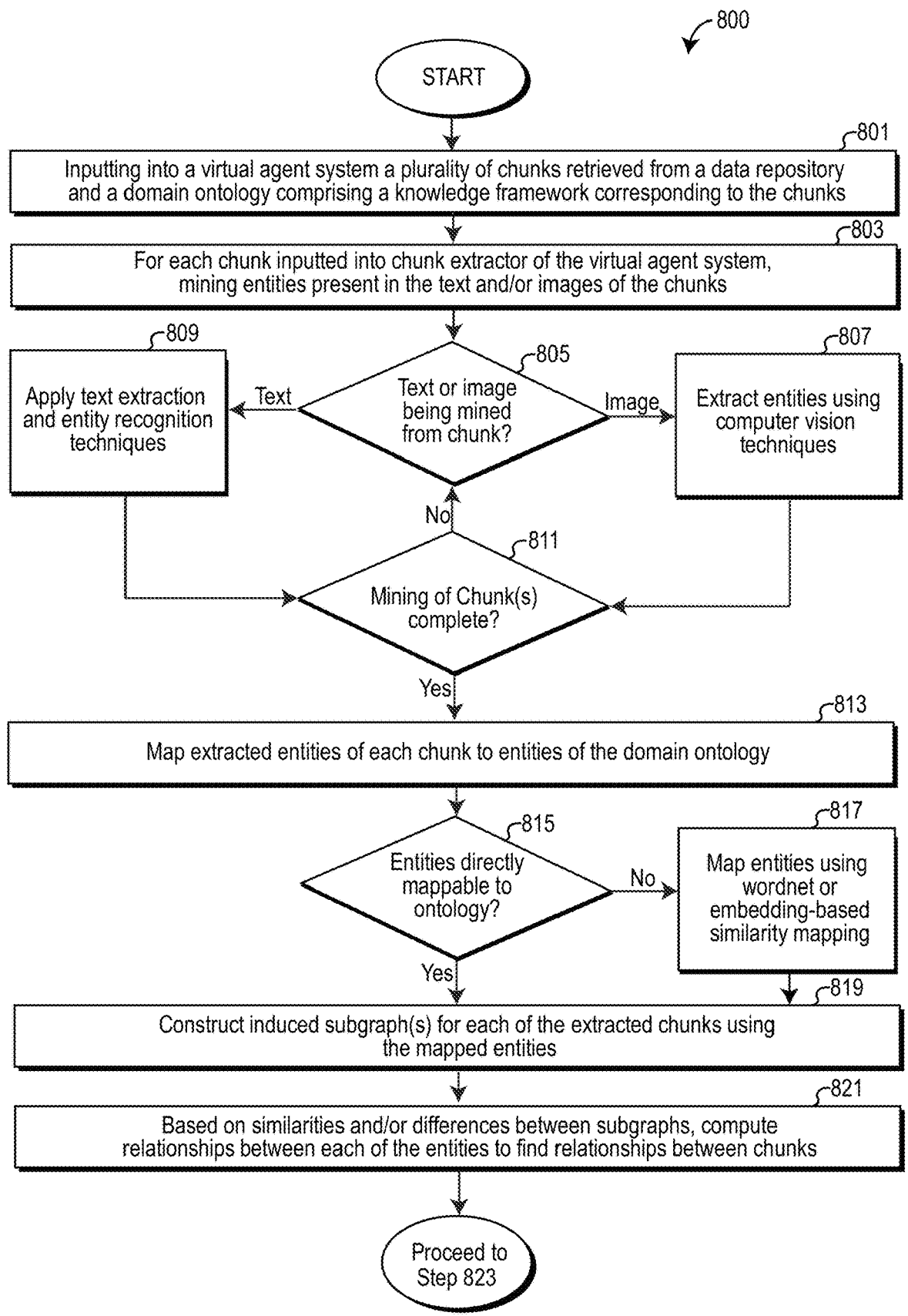
FIG. 8A depicts a flow diagram describing an embodiment of a method for extracting relationships among chunks, in accordance with the present disclosure.
Figure 8B:
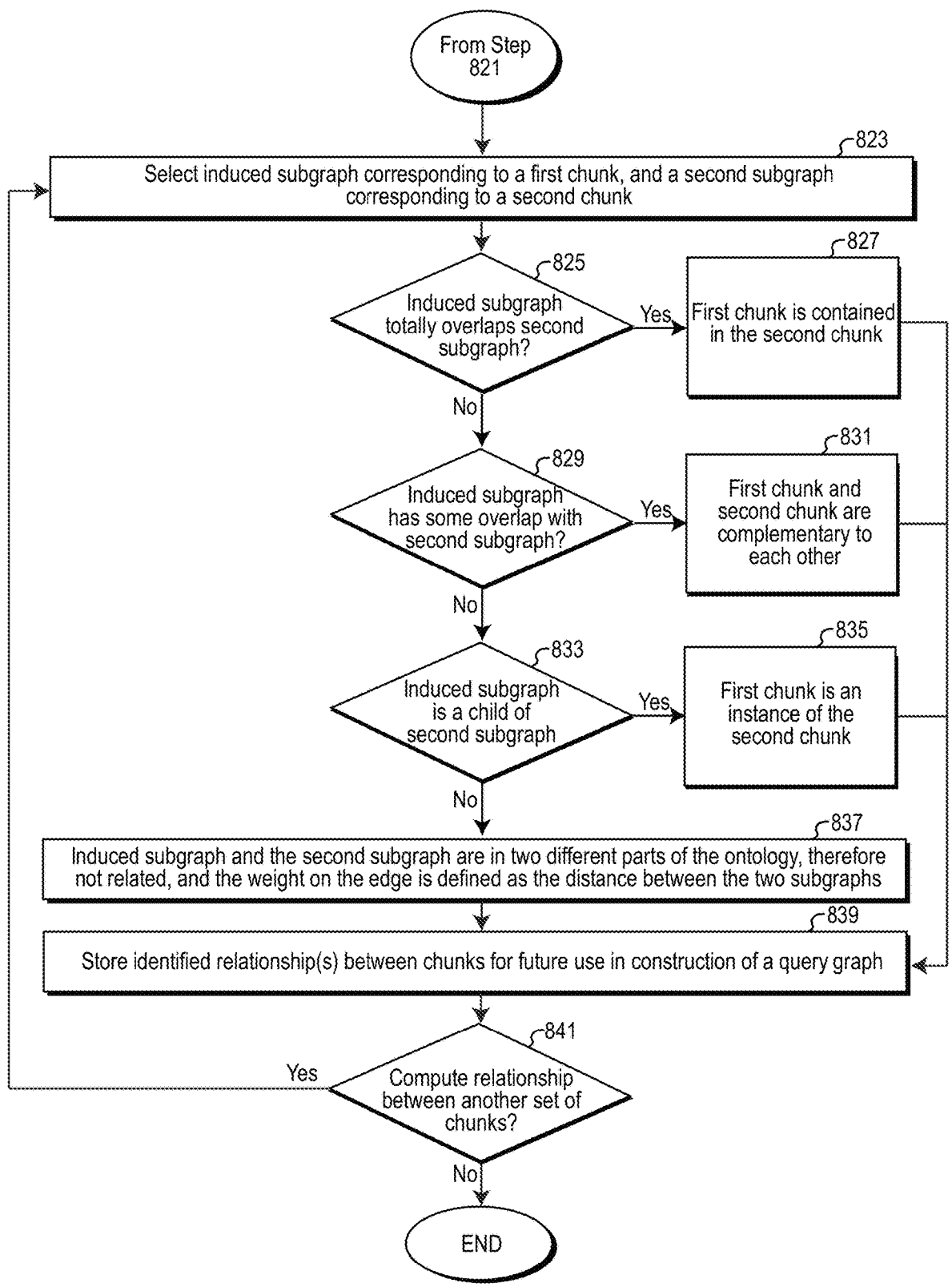
FIG. 8B depicts continuation of the flow diagram of FIG. 8A, describing the embodiment of the method for extracting relationships among chunks, in accordance with the present disclosure.
Figure 9:
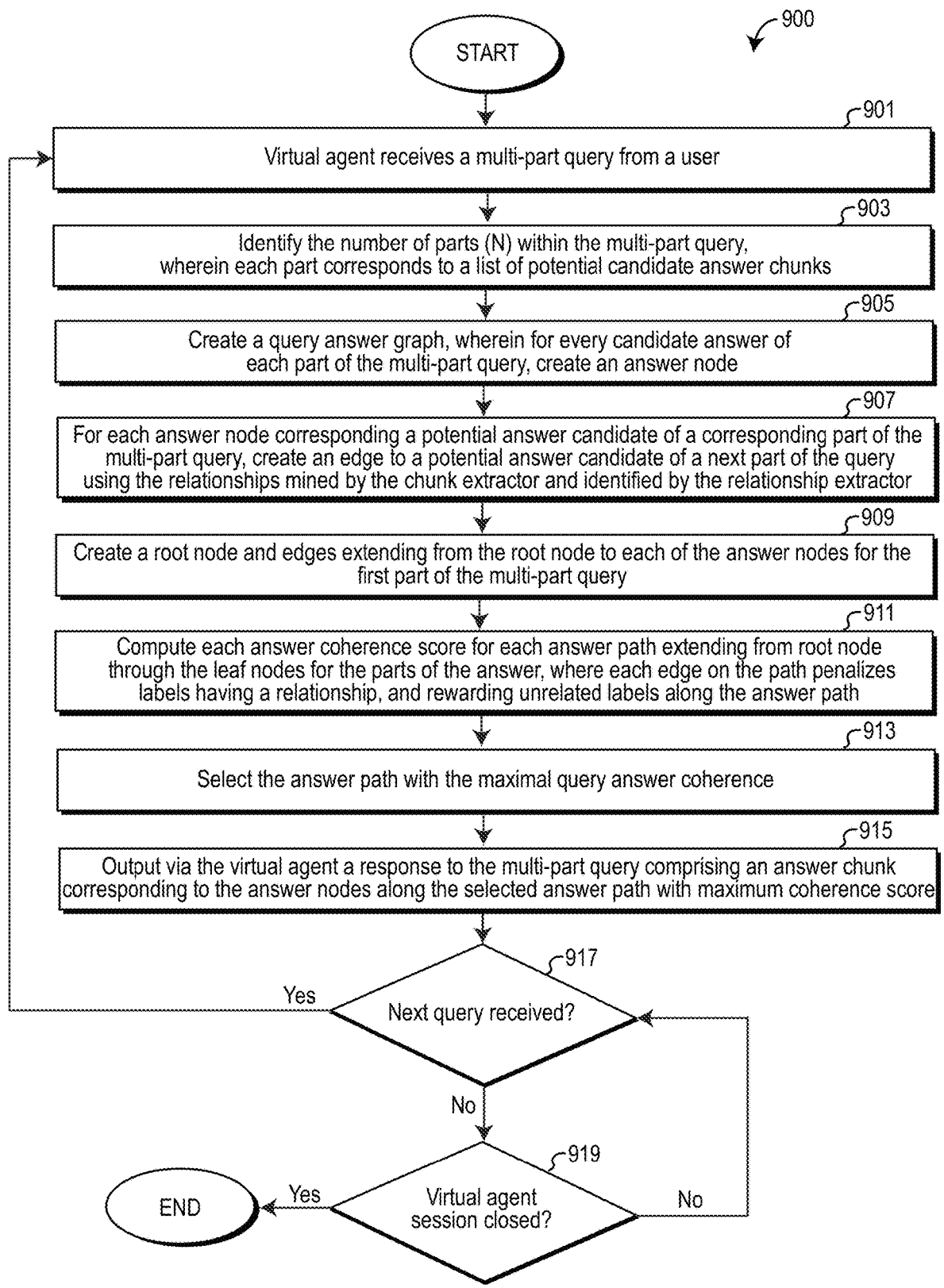
FIG. 9 depicts a flow diagram describing an embodiment of a method maximizing query answer coherence using the relationships among the chunks extracted by the method of FIG. 8A-8B, in accordance with the present disclosure.

Method for Maximizing Answer Coherence of Multi-Part Query Using Extracted Relationships Between Chunks The drawing of FIGS. 8A-8B represents an embodiment of a computer-implemented method 800, for extracting relationships between chunks of one or more supporting documents 701. The drawing of FIG. 9 represents an embodiment of a computer-implemented method 900 for maximizing query answer coherence in response to multi-part queries, using the relationships between chunks identified using method 800. The methods 800, 900 as shown and described by FIGS. 8A-9, may use one or more computer systems, defined generically by computing system 100 of FIG. 1, and more specifically by the embodiments, depicted in FIGS. 2-7 and as described herein. A person skilled in the art should recognize that the steps of the methods 800, 900 described in FIGS. 8A-9 may be performed in a different order than presented. The methods 800, 900 may not necessarily require all the steps described herein to be performed. Rather, some embodiments of methods 800, 900 may be altered by performing a subset of steps using one or more of the steps discussed below.

Embodiments of the method 800 may begin at step 801. In step 801, a plurality of chunks retrieved from one or more support documents 701 of a data repository 517 along with a domain ontology comprising a framework corresponding to the chunks which can be retrieved from a knowledge base 519. The chunks retrieved from the data repository 517 can be inputted into a chunk extractor 507. In step 803, for each chunk inputted into the chunk extractor 507 of virtual agent system 501, the chunk extractor 507 mines each chunk for one or more entities present within the text and/or images of the corresponding chunks inputted therein. In step 805, a determination is made by the chunk extractor 507 whether the chunk extractor 507 is mining from the chunk, text or an image. If text is being mined from the chunk being processed by the chunk extractor 507, the method 800 may proceed to step 809 whereby the chunk extractor 507 applies text extraction and/or other entity recognition techniques to the chunk in order to mine the entities from the chunk being processed. Alternatively, if a determination is made in step 805 that an image is being mined from the chunk by the chunk extractor 507, the method 800 may proceed to step 807. During step 807, the chunk extractor 507 extracts one or more entities from the image using computer vision techniques. For example, object detection. Upon processing of a chunk via step 807 or 809, the method at step 811 further determines whether the mining of the one or more chunks is complete by the chunk extractor 507. If mining each of the chunks for entities is not completed, the method 800 may return to step 805 whereby mining of the chunks can continue and/or the chunk extractor 507 may select the next chunk of the supporting documents 701 and proceed to mine said next chunk's text and/or images for entities. Conversely, once the mining of the chunks in step 811 is completed, the method 800 may proceed to step 813.

During step 813, relationship extractor 509 may map the entities extracted from the chunks by the chunk extractor 507 to entities of the domain ontology. The mapping of extracted entities to the domain ontology may be a direct mapping or an indirect mapping of the entities. In step 815, a determination is made by the relationship extractor 509 whether an entity extracted from a chunk being processed can be mapped directly to the domain ontology. If the entities extracted by the chunk extractor 507 cannot be directly mapped to the domain ontology, the method 800 may proceed to step 817. During step 817, the relationship extractor 509 maps the entities of the extracted chunk using a wordnet or an embedding-based similarity to map the entities. Likewise, if in step 815 entities extracted by the chunk extractor 507 can be mapped directly to the domain ontology, relationship extractor 509 directly maps each of the entities extracted to the corresponding entities of the domain ontology and proceeds to step 819.

During step 819 of method 800, relationship extractor 509 constructs an induced subgraph for each of the chunks extracted by the chunk extractor 507 using the entities mapped to the ontology in steps 813, 815 and 817. In step 821, relationship extractor 509 can compare the similarities and differences between the subgraphs constructed in step 819 and based on the similarities and differences between each of the entities in the subgraphs, find relationships between the chunks. In step 823, the relationship extractor selects an induced subgraph corresponding to a first chunk and a second subgraph corresponding to a second chunk. Based on the comparison of the subgraphs, in step 825, a determination is made whether or not the entities of the first subgraph completely overlaps the entities of the second subgraph. If there is a complete overlap of the entities within the subgraphs, the method may proceed to step 827, whereby a relationship is determined that the first chunk is completely contained within the second chunk. Moreover, if there is not a complete overlap of entities within the subgraphs, the method 800 may proceed to step 829.

In step 829, a further determination may be made whether the entities of the induced subgraph of the first chunk partially overlap with the entities of the second subgraph. If a partial overlap of entities exists, the method proceeds to step 831, whereby a relationship between the first chunk and the second chunk is determined to be complimentary to one another. Conversely, if in step 829, the subgraphs do not partially overlap, method 800 may proceed to step 833. During step 833, a further determination can be made based on the comparison of the subgraphs, whether or not the induced subgraph describing the extracted first chunk is a child of the second subgraph. If the subgraphs have a parent-child relationship, the method 800 may proceed to step 835, wherein the relationship is identified as the first chunk being an instance of the second chunk.

If during step 833, a determination is made by the relationship extractor 509 that the first subgraph is not a child of the second subgraph, the method 800 may proceed to step 837. During step 837, the relationship extractor 509 may determine that the induced subgraph of the first chunk is not related to the second subgraph describing the second chunk, and that the subgraphs are positioned within two separate portions of the ontology. Therefore, the first chunk and the second chunk are deemed to be not related. Relationship extractor 509 may further define a weight on the edge between the two subgraphs as the distance between the two subgraphs.

In step 839, the relationship extractor 509 may store the relationships between the first chunk and the second chunk for future use in the construction of a query answer graph, during the method 900 for maximizing answer coherence of a multi-part user query. For example, the relationship identified between the first chunk and the second chunk may be stored as part of the knowledge base 519, within relationship extractor 509 and/or stored as part of answer module 503 or virtual agent system 501. In step 841, the relationship extractor 509 may determine whether or not another set of extracted chunks should have their relationship computed by the relationship extractor 509. If additional chunks are available for relationship identification, the method 800 may proceed back to step 823, whereby the relationship extractor selects an induced subgraph for a first chunk and a second subgraph of a second chunk being compared by the relationship extractor 509. Moreover, if in step 841 the relationship extractor 509 has finished identifying relationships between the extracted chunks, method 800 may end.

FIG. 9 represents an embodiment of a computer-implemented method 900, for maximizing query answer coherence in response to multi-part queries received by a virtual agent from a user. The method 900 may begin at step 901. During step 901, a query answer extractor 513 receives a multi-part query from a user device 305. For example, via a user interface 525 facilitating an interaction between a user and a virtual agent. During interaction, the virtual agent may receive the multi-part query and may input the multi-part query into the query answer extractor 513. In step 903, the query answer extractor 513 may identify a number of parts (N) that comprise the multi-part query, wherein each part of the query corresponds to a list of potential candidate answer chunks. Upon identifying the number of parts and the potential answer candidate answer chunks associated with each part, in step 905, query answer coherence maximizer 511 can create a query answer graph. The query answer graph generates an answer node on the graph for every potential candidate answer identified for each part of the multi-part query by the query answer extractor 513.

In step 907, the query answer coherence maximizer 511 may, for each answer node of the query answer graph corresponding to a potential answer candidate of a corresponding part of the multi-part query, create an edge extending from the answer node of each potential answer candidate for a first part to each potential answer candidate of a subsequent part of the multi-part query. Along each edge connecting one or more answer nodes, the query answer coherence maximizer 511 may label the relationships between chunks associated with their respective answer nodes, using the relationships mined by the chunk extractor 507 and identified by the relationship extractor 509. In step 909, a root node can be added to the query answer graph and edges may be added by extending edges from the root node to each of the answer nodes corresponding to the first part of the multi-part query. In step 911, query answer coherence maximizer 511 can compute an answer coherence score for each answer pathway of the query answer graph. The answer pathways can extend from the root node through at least one answer node for each of the parts of the multi-part query answer. During the calculation of the answer coherence score, each edge on the answer pathway can be penalized or rewarded based on the labels corresponding to the edges between answer nodes. For edges labelled is a manner indicating a relationship between the answer node indicating the answer chunks are complimentary to one another, contained within one another or instances of one another, a penalty can be applied. For example, a −1 penalty for each edge indicating a relationship between answer nodes along the answer pathway. Likewise, for edges between answer nodes that are unlabeled indicating that the answer nodes are unrelated to one another, a reward may be applied to the coherence score of the answer pathway.

In step 913, the query answer coherence maximizer 511 may select an answer pathway with the highest coherence score, indicating maximum query answer coherence. In step 915, reporting module 515 may output a response to the multi-part query via the virtual agent. In the response reported by the reporting module 515, answer chunks corresponding to the answer nodes along the answer pathway selected in step 913 can be provided to the user. In step 917, a determination may be made whether a new query has been received from the user. If a new query has been received, the method 900 may return to step 901. Otherwise, the method may proceed to step 919. During step 919, the method 900 may assess whether or not a user has closed the session with the virtual agent. If the session has not closed, the method 900 may return to step 917 whereby the method 900 may wait for receipt of a new query. Conversely, if the session with the virtual agent has closed, the method 900 may end.

What is claimed is:

1. A computer-implemented method for maximizing answer coherence of a multi-part query using extracted relationships between chunks of at least one support document, the computer-implemented method comprising:

receiving, by a processor, the multi-part query from a user;

identifying, by the processor, a number of parts comprising the multi-part query using natural language processing (NLP) based on identifying a tone or sentiment of the user associated with the multi-part query, wherein each of the number of parts corresponds to a list of potential candidate answers extracted as the chunks from the at least one support document;

creating, by the processor, a query graph comprising a plurality of answer nodes, wherein each of the answer nodes correspond to each of the potential candidate answers corresponding to each of the number of parts comprising the multi-part query, and edges connect a root node to answer nodes corresponding to a first part of the multi-part query, and the answer nodes corresponding to the first part of the multi-part query are connected by the edges to answer nodes corresponding to a subsequent part of the multi-part query;

forming, by the processor, a plurality of answer node pathways within the query graph, extending from the root node through each of answer nodes, wherein each answer node pathway follows a different set of answer nodes and edges connected along the query graph;

computing, by the processor, an answer coherence score for each answer node pathway, wherein computing the answer coherence score for each answer node pathway includes traversing, by the processor, each answer node pathway starting from the root node and for each edge between the answer nodes labelled as having a relationship between the answer nodes penalizing the edge, while rewarding edges between unrelated answer nodes along the answer node pathway, and wherein the answer coherence score for each answer node pathway penalizes edges along an answer node pathway that represent relationships between answer nodes and rewards answer node pathways that include edges between answer nodes that are unlabeled and unrelated to one another, and wherein the relationships correspond to nodes that are complementary to, contained within, or an instance of one another; and selecting, by the processor, an answer to the multi-part query using the answer nodes along the answer node pathway having a maximum answer coherence score.

2. The computer-implemented method of claim 1, wherein penalizing the edge includes applying a score of −1 to the answer coherence score for each edge connecting the answer nodes having a relationship and rewarding the edges between the unrelated answer nodes includes adding to the answer coherence score, an edge weight present on each edge between the unrelated answer nodes.

3. The computer-implemented method of claim 1, further comprising extracting the relationships between the chunks of the at least one support document, wherein extraction of the relationships comprises:
   inputting, by the processor, a plurality of the chunks retrieved from at least one support document into a chunk extractor;
   mining, by the processor, from each of the chunks, entities present within text or images of the chunks;
   mapping, by the processor, the entities extracted from each of the chunks to entities of a domain ontology;
   constructing, by the processor, an induced subgraph for each extracted chunk using the entities mapped to the domain ontology; and
   comparing, by the processor, similarities and differences between each induced subgraph to identify relationships between the chunks of the at least one support document.

4. The computer-implemented method of claim 3, wherein the entities from one or more of the chunks that cannot be directly mapped to the domain ontology are mapped using a wordnet or an embedding-based similarity mapping.

5. The computer-implemented method of claim 3, wherein upon comparing the similarities and the differences between each induced subgraph to identify relationships between the chunks, a first induced subgraph totally overlapping a second subgraph indicates a first chunk is contained in a second chunk; the first induced subgraph having partial overlap with the second subgraph indicates the first chunk and second chunk are complementary to each other; and the first induced subgraph being a child of the second subgraph indicates the first chunk is an instance of the second chunk.

6. The computer-implemented method of claim 5, wherein upon comparing the similarities and the differences between each induced subgraph to identify relationships between the chunks, the first induced subgraph and the second subgraph are positioned within two different parts of the domain ontology indicates the first chunk and the second chunk are not related and a weight on an edge of the query graph connecting an answer node comprising first chunk to an answer node comprising the second chunk is defined by a distance between the first induced subgraph and the second subgraph.

7. A computer system for maximizing answer coherence of a multi-part query using extracted relationships between chunks of at least one support document comprising:
   a processor; and
   a computer-readable storage media coupled to the processor, wherein the computer-readable storage media contains program instructions executing, via the processor, a computer-implemented method comprising:
   receiving, by the processor, the multi-part query from a user;
   identifying, by the processor, a number of parts comprising the multi-part query using natural language processing (NLP) based on identifying a tone or sentiment of the user associated with the multi-part query, wherein each of the number of parts corresponds to a list of potential candidate answers extracted as the chunks from the at least one support document;
   creating, by the processor, a query graph comprising a plurality of answer nodes, wherein each of the answer nodes correspond to each of the potential candidate answers corresponding to each of the number of parts comprising the multi-part query, and edges connect a root node to answer nodes corresponding to a first part of the multi-part query, and the answer nodes corresponding to the first part of the multi-part query are connected by the edges to answer nodes corresponding to a subsequent part of the multi-part query;
   forming, by the processor, a plurality of answer node pathways within the query graph, extending from the root node through each of answer nodes, wherein each answer node pathway follows a different set of answer nodes and edges connected along the query graph;
   computing, by the processor, an answer coherence score for each answer node pathway, wherein computing the answer coherence score for each answer node pathway includes traversing, by the processor, each answer node pathway starting from the root node and for each edge between the answer nodes labelled as having a relationship between the answer nodes penalizing the edge, while rewarding edges between unrelated answer nodes along the answer node pathway and wherein the answer coherence score for each answer node pathway penalizes edges along an answer node pathway that represent relationships between answer nodes and rewards answer node pathways that include edges between answer nodes that are unlabeled and unrelated to one another, and wherein the relationships correspond to nodes that are complementary to, contained within, or an instance of one another; and
   selecting, by the processor, an answer to the multi-part query using the answer nodes along the answer node pathway having a maximum answer coherence score.

8. The computer system of claim 7, wherein penalizing the edge includes applying a score of −1 to the answer coherence score for each edge connecting the answer nodes having a relationship and rewarding the edges between the unrelated answer nodes includes adding to the answer coherence score, an edge weight present on each edge between the unrelated answer nodes.

9. The computer system of claim 7, further comprising extracting the relationships between the chunks of the at least one support document, wherein extraction of the relationships comprises:
   inputting, by the processor, a plurality of the chunks retrieved from at least one support document into a chunk extractor;
   mining, by the processor, from each of the chunks, entities present within text or images of the chunks;
   mapping, by the processor, the entities extracted from each of the chunks to entities of a domain ontology;
   constructing, by the processor, an induced subgraph for each extracted chunk using the entities mapped to the domain ontology; and comparing, by the processor, similarities and differences between each induced subgraph to identify relationships between the chunks of the at least one support document.

10. The computer system of claim 9, wherein the entities from one or more of the chunks that cannot be directly mapped to the domain ontology are mapped using a wordnet or an embedding-based similarity mapping.

11. The computer system of claim 9, wherein upon comparing the similarities and the differences between each induced subgraph to identify relationships between the chunks, a first induced subgraph totally overlapping a second subgraph indicates a first chunk is contained in a second chunk; the first induced subgraph having partial overlap with the second subgraph indicates the first chunk and second chunk are complementary to each other; and the first induced subgraph being a child of the second subgraph indicates the first chunk is an instance of the second chunk.

12. The computer system of claim 11, wherein upon comparing the similarities and the differences between each induced subgraph to identify relationships between the chunks, the first induced subgraph and the second subgraph are positioned within two different parts of the domain ontology indicates the first chunk and the second chunk are not related and a weight on an edge of the query graph connecting an answer node comprising first chunk to an answer node comprising the second chunk is defined by a distance between the first induced subgraph and the second subgraph.

13. A computer program product for maximizing answer coherence of a multi-part query using extracted relationships between chunks of at least one support document comprising:
one or more computer readable storage media having computer-readable program instructions stored on the one or more computer readable storage media, said program instructions executes a computer-implemented method comprising:
receiving, by the processor, the multi-part query from a user;
identifying, by the processor, a number of parts comprising the multi-part query using natural language processing (NLP) based on identifying a tone or sentiment of the user associated with the multi-part query, wherein each of the number of parts corresponds to a list of potential candidate answers extracted as the chunks from the at least one support document;
creating, by the processor, a query graph comprising a plurality of answer nodes, wherein each of the answer nodes correspond to each of the potential candidate answers corresponding to each of the number of parts comprising the multi-part query, and edges connect a root node to answer nodes corresponding to a first part of the multi-part query, and the answer nodes corresponding to the first part of the multi-part query are connected by the edges to answer nodes corresponding to a subsequent part of the multi-part query;
forming, by the processor, a plurality of answer node pathways within the query graph, extending from the root node through each of answer nodes, wherein each answer node pathway follows a different set of answer nodes and edges connected along the query graph;
computing, by the processor, an answer coherence score for each answer node pathway, wherein computing the answer coherence score for each answer node pathway includes traversing, by the processor, each answer node pathway starting from the root node and for each edge between the answer nodes labelled as having a relationship between the answer nodes penalizing the edge, while rewarding edges between unrelated answer nodes along the answer node pathway, and wherein the answer coherence score for each answer node pathway penalizes edges along an answer node pathway that represent relationships between answer nodes and rewards answer node pathways that include edges between answer nodes that are unlabeled and unrelated to one another, and wherein the relationships correspond to nodes that are complementary to, contained within, or an instance of one another; and
selecting, by the processor, an answer to the multi-part query using the answer nodes along the answer node pathway having a maximum answer coherence score.

14. The computer program product of claim 13, wherein penalizing the edge includes applying a score of −1 to the answer coherence score for each edge connecting the answer nodes having a relationship and rewarding the edges between the unrelated answer nodes includes adding to the answer coherence score, an edge weight present on each edge between the unrelated answer nodes.

15. The computer program product of claim 13, further comprising extracting the relationships between the chunks of the at least one support document, wherein extraction of the relationships comprises:
inputting, by the processor, a plurality of the chunks retrieved from at least one support document into a chunk extractor;
mining, by the processor, from each of the chunks, entities present within text or images of the chunks;
mapping, by the processor, the entities extracted from each of the chunks to entities of a domain ontology;
constructing, by the processor, an induced subgraph for each extracted chunk using the entities mapped to the domain ontology; and
comparing, by the processor, similarities and differences between each induced subgraph to identify relationships between the chunks of the at least one support document.

16. The computer program product of claim 13, wherein upon comparing the similarities and the differences between each induced subgraph to identify relationships between the chunks, a first induced subgraph totally overlapping a second subgraph indicates a first chunk is contained in a second chunk; the first induced subgraph having partial overlap with the second subgraph indicates the first chunk and second chunk are complementary to each other; and the first induced subgraph being a child of the second subgraph indicates the first chunk is an instance of the second chunk.

17. The computer program product of claim 16 wherein upon comparing the similarities and the differences between each induced subgraph to identify relationships between the chunks, the first induced subgraph and the second subgraph are positioned within two different parts of the domain ontology indicates the first chunk and the second chunk are not related and a weight on an edge of the query graph connecting an answer node comprising first chunk to an answer node comprising the second chunk is defined by a distance between the first induced subgraph and the second subgraph.

* * * * *